(12) United States Patent  
Uwabo et al.

(10) Patent No.: US 6,477,015 B1  
(45) Date of Patent: Nov. 5, 2002

(54) MAGNETIC DISK DRIVE

(75) Inventors: Tsuneo Uwabo; Yoshihiro Okano; Eiichi Yoneyama; Yoshinori Tangi, all of Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/492,074

(22) Filed: Jan. 27, 2000

(30) Foreign Application Priority Data

Jan. 29, 1999 (JP) .......................................... 11-022957

(51) Int. Cl.$^7$ ............................ G11B 23/00; G11B 5/54
(52) U.S. Cl. ................... 360/255.6; 360/254.1; 360/255.9
(58) Field of Search ................... 360/255.6, 255.7, 360/255.8, 255.9, 254.1

(56) References Cited

U.S. PATENT DOCUMENTS 5,231,549 A * 7/1993 Morehouse et al. .......... 360/75
5,966,270 A * 10/1999 Coon ...................... 360/244.2
6,091,586 A * 7/2000 Shigemoto ............... 360/254.1

FOREIGN PATENT DOCUMENTS

JP           06-068482      * 3/1994

* cited by examiner

*Primary Examiner*—David L. Ometz
(74) *Attorney, Agent, or Firm*—Whitham, Curtis & Christofferson, P.C.

(57) ABSTRACT

A movable member 35 is moved back or forth by a motor 33. A carriage opening/closing member 41 which vertically guides a pair of projections 40 opposingly formed on opposed faces is disposed between upper and lower carriages 36 and 37 which are elastically supported on the movable member 35 and vertically opposed to each other. Reading/writing heads 19 which are opposingly disposed on the opposed faces of the upper and lower carriages 36 and 37 are separated from magnetic data recording surfaces 7 of a magnetic data recording medium 6. When the carriage opening/closing member is moved in a direction opposite to the above, the upper and lower reading/writing heads 19 are contacted with the magnetic data recording surfaces 7 by a predetermined load pressure.

3 Claims, 4 Drawing Sheets

MAGNETIC DISK DRIVE

BACKGROUND OF INVENTION

1 Field of the Invention

The present invention relates to a magnetic disk drive which magnetically reads and writes data, and more particularly to a reading/writing device which reads from and writes data onto a magnetic data recording medium of a magnetic disk.

2 Related Art

FIG. 4 shows a prior art magnetic disk drive of this kind. In the FIG. 1 denotes a magnetic disk, 2 denotes the magnetic disk drive, and 3 denotes a reading/writing head device which is incorporated so as to read from and write magnetic data onto the magnetic disk 1. As shown in the figure, in the magnetic disk 1, a disk-like magnetic data recording medium (not shown) is rotatably incorporated in a pair of upper and lower shells 4 which are bonded to each other. A window 5 is formed in each of the shells 4 so that magnetic data recording surfaces 7 of the magnetic data recording medium 6 are partly exposed with a predetermined width in the sector direction and the whole width in the track direction. The windows 5 are opened and closed by slidingly moving a shutter 8 which is disposed so as to be slidable along end faces of the shells. An opening/closing lever device 9 for opening and closing the shutter 8 is disposed in the magnetic disk drive 2.

The opening/closing lever device 9 is placed in an upper side portion of the inner space of the magnetic disk drive 2. The lever device is disposed so that, when the magnetic disk 1 is inserted through a slot 11 of a disk holder 10, an input end 13 of a lever 12 abuts against the leading end faces of the shells 4 in the insertion direction, and also that, in accordance with the insertion of the magnetic disk 1, the input end 13 of the lever 12 is moved from the outer side in the width direction toward the inner side along the leading end faces of the shells 4 in the insertion direction. When the input end 13 of the lever 12 abuts against one end face of the shutter 8 in the width direction, the opening operation of the shutter 8 is started, and, when the magnetic disk 1 is completely housed in the disk holder 10, the shutter 8 is held to a fully opened state. In order to perform reading and writing of data on the magnetic data recording medium 6, a movable member 15 is disposed on a chassis 14 of the magnetic disk drive 2 so as to be movable back and forth. An upper carrier 17 is supported via a plate spring 16 on an upper portion of the tip end face of the movable member 15, and a lower carrier 18 is disposed on a lower portion of the tip end face so as to be opposed to the upper carrier 17.

Reading/writing heads 19 which read and write magnetic data are respectively fixed to leading end portions of the opposed faces of the upper and lower carriages 17 and 18 so as to be opposed to each other. The upper carrier 17 is integrally provided with support arms 20 which are outwardly projected from the right and left sides, respectively. A head-loading arm 21 disposed on the disk holder 10 supports one of the support arms 20 from the lower side. The upper carrier 17 is lowered from a disk insertion/ejection position which is relatively higher, to a read/write position which is relatively lower, by lowering the disk holder 10. At this time, the elastic force of the plate spring 16 causes the reading/writing heads 19 to be respectively contacted with the magnetic data recording surfaces 7 of the magnetic data recording medium 6 by a predetermined load pressure. In the disk holder 10, a cutaway portion 22 is formed by removing portions of faces which are opposed to the upper and lower carriages 17 and 18. The head-loading arm 21 is placed in the vicinity of the cutaway portion 22.

FIG. 5 is a side view of the disk drive 2. A cam plate 24 which is used for raising and lowering the disk holder 10 is interposed between the lower face of the disk holder 10 and the upper face 23 of the chassis 14, so as to be movable back and forth. Support shafts 28 which are outward protruded from the right and left sides of the disk holder 10 are vertically guided by flanges 26 and cam grooves 27 that are disposed on the cam plate 24, thereby raising and lowering the disk holder. The flanges 26 of the cam plate 24 are set to have a height which, when the support shafts 28 are supported on the upper end faces of the flanges, allows the disk holder 10 to be located at the disk insertion/ejection position. Each of the cam grooves 27 elongates obliquely downward toward the rear side of the chassis 14, and one end of the groove is opened in the upper end face of the corresponding one of the flanges 26 of the disk holder 10. The positions of the support shafts 28 and the cam grooves 27 are set so that the support shafts 28 are engaged from the rear side of the chassis 14 with the open ends of the cam grooves 27 and vertically moved along the cam grooves 27. The lifts of the cam grooves 27 are set so as to correspond to the elevating stroke of the disk holder 10. As a result, the disk holder 10 can be switched between the disk insertion/ejection position and the disk read/write position by a reciprocal movement of the cam plate 24.

In the magnetic disk drive 2 of the prior art, the magnetic disk 1 can be set to the read/write position by simply inserting the magnetic disk 1 into the disk holder 10 and then pushing the disk by a predetermined distance.

When the support arms 20 for raising and lowering the upper carrier 17 are formed by resin molding or the like so as to be outwardly projected, resonance occurs depending on the shapes, weights, and the like of the upper carrier 17 and the support arms 20. Alternatively, a method may be employed in which the upper carrier 17 is formed as a metal pressed product or a resin molded product, and the support arms 20 are formed as independent parts and then attached to the upper carrier 17. In the alternative, since the support arms 20 are formed as independent parts and the upper carrier 17 is formed into a complex shape by press-working or resin molding, a problem is caused in that the production costs is increased.

SUMMARY OF INVENTION

Consequently, there arises a technical problem which is to be solved in order to configure a magnetic disk drive of a simple structure and suppress resonance. It is an object of the invention to solve the technical problem.

The invention has been conducted in order to attain the object.

The invention provides a magnetic disk drive in which upper and lower carriages are elastically supported on a movable member that is moved back and forth by an actuator, to be vertically opposed to each other, and a pair of upper and lower reading/writing heads are respectively disposed on opposed faces of the upper and lower carriages, the heads being respectively contacted from upper and lower sides with magnetic data recording surfaces of a magnetic data recording medium by a predetermined load pressure, to read and write data, wherein projections are respectively disposed on the opposed faces of the pair of upper and lower carriages, to be opposed to each other, slopes of a rising gradient and a falling gradient are formed in a space which is between the pair of upper and lower carriages and behind the projections, the slopes respectively allowing, when the movable member is separated from a zero track position of the magnetic data recording medium to be further moved toward a radial outside, the upper projection to be obliquely upward moved in a sliding manner, and the lower projection to be obliquely downward moved in a sliding manner, and the pair of upper and lower reading/writing heads are respectively separated from the magnetic data recording surfaces by overriding of the projections over the slopes and sliding movements of the projections.

Furthermore, the invention provides a magnetic disk drive in which, in each of the rising-gradient slope, the falling-gradient slope, and the projections, hardness of at least a surface is set not to be lower than a predetermined value, for mutual sliding movement.

BRIEF DESCRIPTION OF THE DRAWINGS

FIG. 4 shows the configuration of main portions of a magnetic disk drive of the prior art, in which

DETAILED DESCRIPTION OF PREFERRED EMBODIMENT

Figure 1:
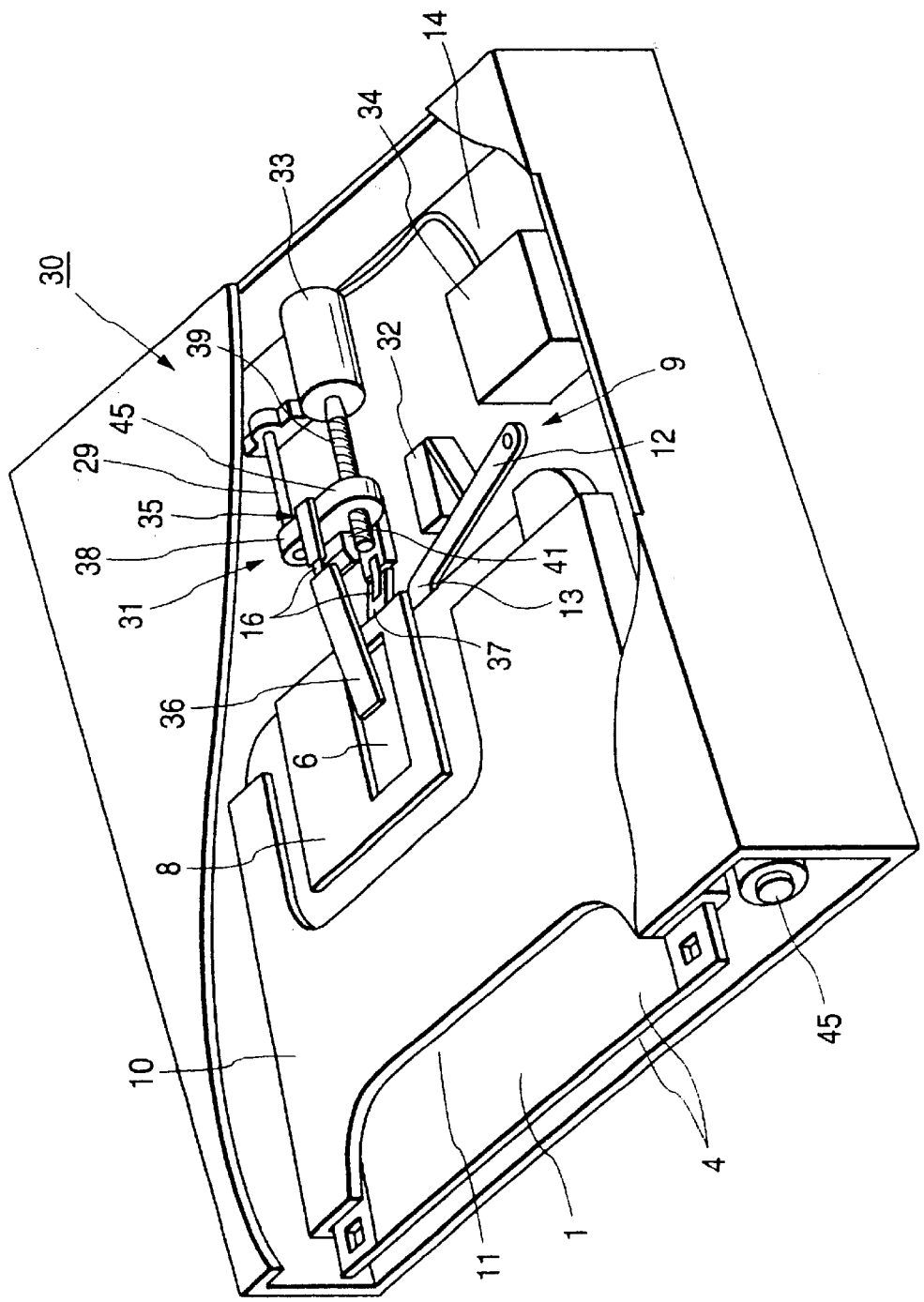
FIG. 1 is a perspective view of an embodiment of the invention and showing the configuration of main portions of a magnetic disk drive, partially cut away.

Hereinafter, an embodiment of the invention will be described with reference to FIGS. 1 to 3. The same components as those of the prior art are denoted by the same reference numerals.

Figure 2:
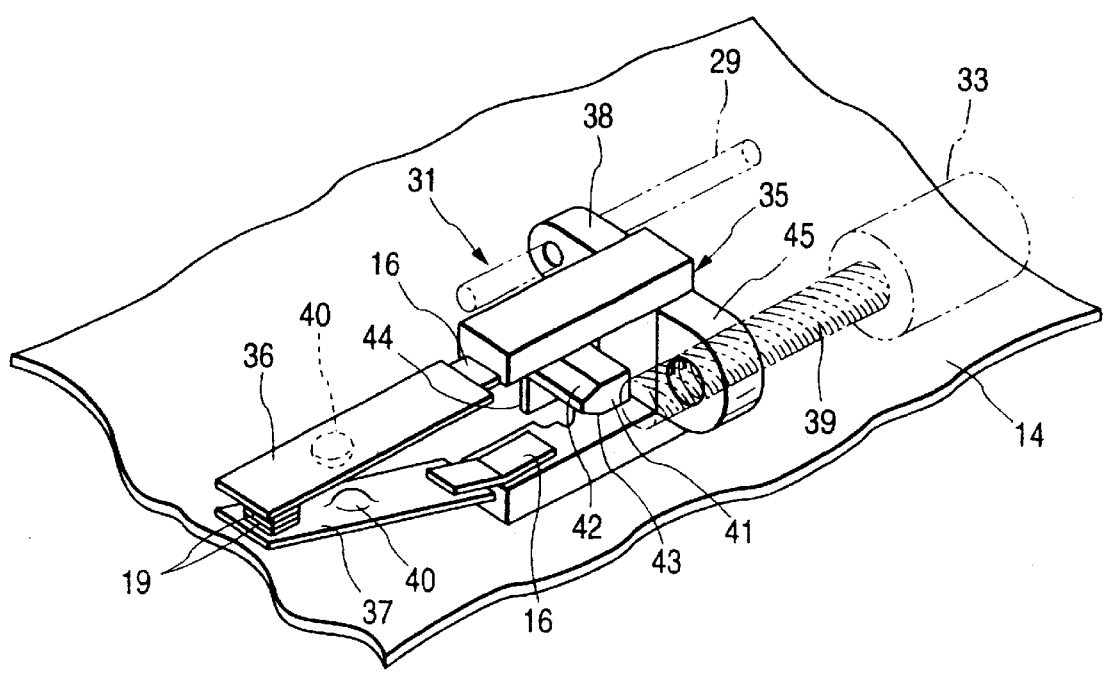
FIG. 2 is a partial perspective view of the embodiment of the invention and showing a reading/writing head device of the magnetic disk drive, partially cut away.

FIG. 1 is a perspective view showing a magnetic disk drive according to the invention, partially cut away, and FIG. 2 shows a reading/writing device of the magnetic disk drive. In the figures, 30 denotes the magnetic disk drive, and 31 denotes a reading/writing head device.

As shown in FIGS. 1 and 2, the magnetic disk drive 30 incorporates: a disk insertion position detecting sensor 32 which detects a fully opened position of the shutter 8 of the magnetic disk 1; a motor 33 (actuator) which moves back and forth the reading/writing device 31 on the basis of a detection signal of the disk insertion position detecting sensor 32; and a controller 34.

The reading/writing device 31 is configured in the following manner. Upper and lower carriages 36 and 37 are elastically supported via the plate springs 16 on a movable member 35 which is movable back and forth in the magnetic disk drive 30. A boss 38 through which a guide rod 29 is passed is disposed on one side of the rear portion of the movable member 35, and a boss 45 into which a screw 39 rotated by the motor 33 is screwed is disposed on the other side of the rear portion, so that the movable member 35 is moved back and forth by forward and reverse rotations of the motor 33. The reading/writing heads 10 are respectively fixed to leading end portions of the opposed faces of the upper and lower carriages 36 and 37 of the movable member 35.

Figure 3A:
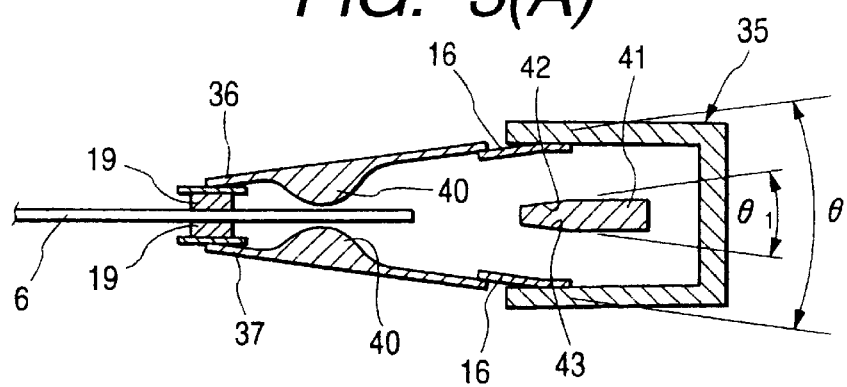
FIGS. 3(A) and (B) show the embodiment of the invention and are section views of a head unit of the reading/writing head device, taken along a radial direction of a magnetic disk.

As shown in FIG. 3(A), the elastic forces of, and the nip angle θ between, the plate springs 16 are set so that the reading/writing heads 19 are respectively contacted with the magnetic data recording surfaces 7 by a predetermined load pressure. Projections 40 are disposed on the opposed faces of the upper and lower carriages 36 and 37 and behind the reading/writing heads 19. A carriage opening/closing member 41 is disposed between the upper and lower carriages 36 and 37 so as to be rearwardly separated from the projections 40 by a predetermined distance. The projections 40 are respectively guided by the member to upward and downward directions, so that the upper and lower carriages 36 and 37 are separated from each other.

In the carriage opening/closing member 41, upper and lower face portions of the end on the side of the magnetic disk 1 are respectively cut away in obliquely downward and upward directions as looking toward the magnetic disk 1. By the member, the upper projection 40 is raised along a rising-gradient slope 42, and the lower projection 40 is simultaneously lowered along a falling-gradient slope 43, whereby the upper and lower carriages 36 and 37 are separated from each other. The member is configured so that, when raised at the maximum degree, the upper and lower reading/writing heads 19 are separated from the magnetic data recording surface of the magnetic data recording medium 6 by a predetermined distance, and, when lowered at the maximum degree, the upper and lower reading/writing heads 19 are contacted with magnetic data recording surface 7 of the magnetic data recording medium 6 by a predetermined load pressure. As shown in FIG. 2, the carriage opening/closing member 41 has a stand 44 on one side, and is configured so that, when the stand 44 is fixed to the chassis 14, the positional relationships with respect to the projections 40 are maintained.

The taper angle θ1 of the carriage opening/closing member 41 is set to a value which enables the leading edges of the slopes 42 and 43 to smoothly enter between the upper and lower projections 40, and at which, when the projections 40 are separated from the slopes 42 and 43 by forward movement of the movable member 35, the reading/writing heads 19 can be contacted with a portion outside track 0 of the magnetic data recording medium 6 at a low speed that does not cause data to be damaged. The rear portion of the carriage opening/closing member 41 is set to have a height at which, under a state where the projections 40 respectively override the slopes 42 and 43, the magnetic data recording medium 6 can be extracted from between the upper and lower reading/writing heads 19 without effort and without being contacted with the heads.

In this case, the carriage opening/closing member 41 and the projections 40 are made of a bearing material which is used in a sliding bearing, such as Juracon (trade name) or an oilless resin material which is obtained by impregnating a resin with lubricating oil, and at least the surface hardness is set to be higher so that the member and the projections are suitable for sliding. Therefore, the sliding properties of the projections 40 and the carriage opening/closing member 41 are improved as far as possible, and the upper and lower carriages 36 and 37 are smoothly raised and lowered. The surfaces of the carriage opening/closing member 41 and the projections 40 may be coated with a resin having an excellent sliding property or Teflon. In the case where the upper and lower carriages 36 and 37 are configured by a steel plate of a predetermined thickness such as a stainless steel plate, the projections 40 may be produced by drawing (embossing). Alternatively, ribs for reinforcing may be integrally formed on both the sides. In the alternative, in order to improve the sliding property, a coating layer of the resin having an excellent sliding property or Teflon is formed on the surfaces of the projections 40. It is a matter of course that the hardness of the coating layer is set to a high value at which an excellent sliding property is attained. Also in the alternative, in order to smoothly raise and lower the reading/writing heads 19 above and below the magnetic data recording surfaces 7 without damaging the magnetic data recording surfaces 7, therefore, it is required only to control forward and reverse rotations and rotation amount of the motor 33.

The controller 34 is configured by a well known microcomputer which mainly consists of a read only memory (ROM), a random access memory (RAM), a central processing unit (CPU), an input/output (I/O) unit, and the like, and controls the reading/writing device which comprises the movable member 35, the motor 33, the upper carriage 36, the lower carriage 37, the reading/writing heads 19, the projections 40, and the carriage opening/closing member 41.

When the disk insertion detecting sensor 32 detects that the shutter 8 of the magnetic disk 1 is fully opened, the controller 34 supplies a driving signal to a driving section of the motor 33 so as to move the movable member 35 from the home position toward the front side, i.e., from the side of the zero track of the magnetic disk 1 toward the 79th track. The disk insertion detecting sensor 32 is configured by a microswitch or a pushbutton switch. As shown in FIG. 1, for example, the switch is places so as to abut against the lever 12 of the opening/closing lever device 9 at a position where the lever 12 causes the shutter 8 to be fully opened, to be turned ON. The driving signal supplied from the controller 34 to the motor 33 is set to have a level corresponding to the range of the track number of the magnetic data recording medium 6, for example, zero to 79th tracks in the case of the double sided, high density (2HD) format. In the embodiment shown, the track position is determined in accordance with a signal from a personal computer. When the projections 40 are separated from the slopes of the carriage opening/closing member 41, the upper and lower carriages 36 and 37 are returned toward the magnetic data recording surfaces 7 by the elastic forces of the plate springs 16, and the reading/writing heads 19 are contacted with portions of the magnetic data recording surfaces 7 which are outside track 0. In other words, when the movable member 35 is in the home position, the reading/writing heads 19 are moved to and contacted with the outer portions of the magnetic data recording surfaces which are in the side opposite to the 79th track side with respect to the zero track.

Figure 3B:
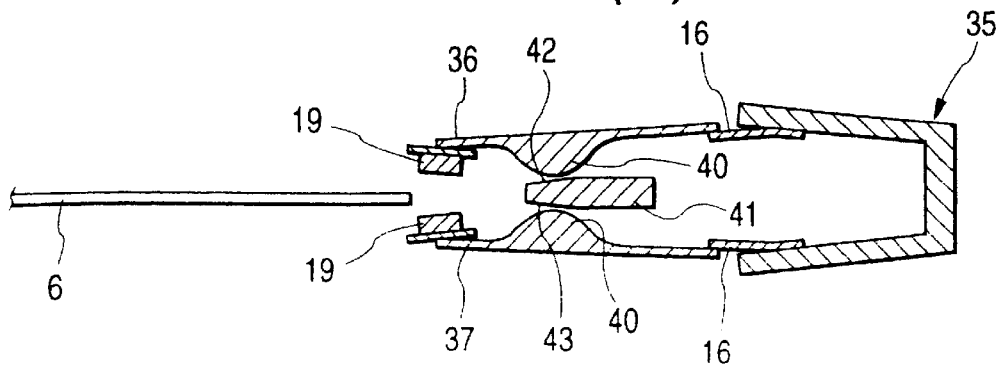
Figure 4A:
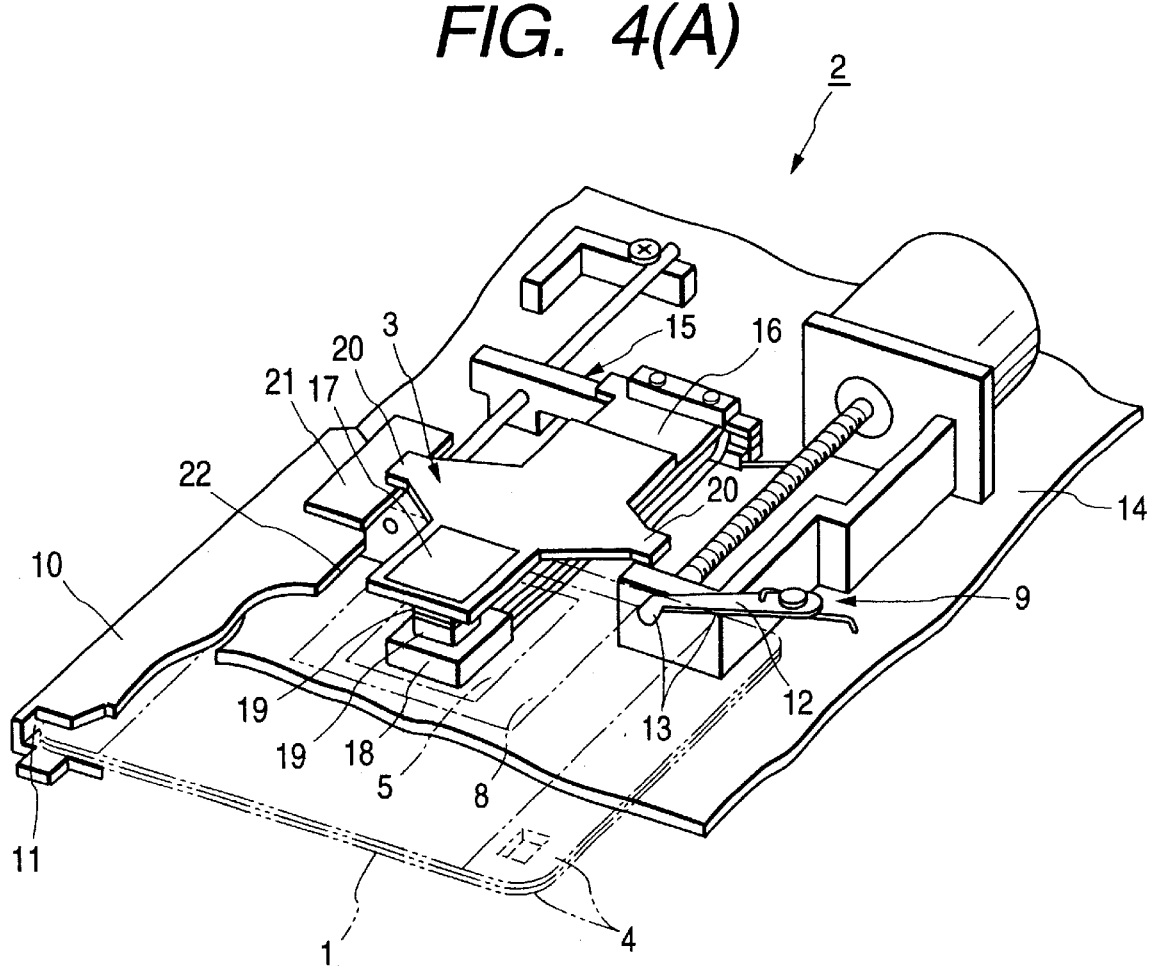
FIG. 4(A) is a perspective view, partially cut away.
Figure 4B:
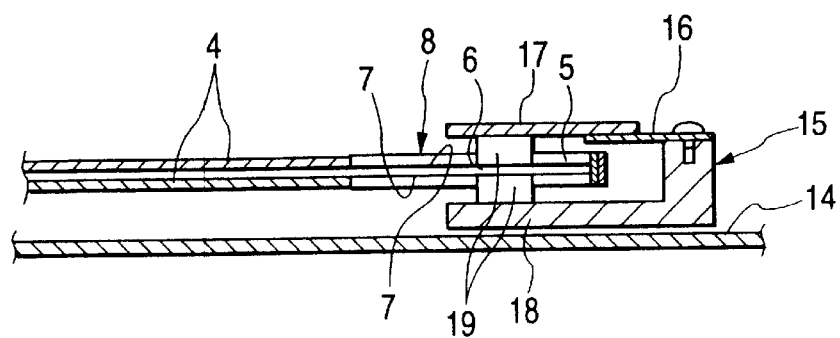
FIG. 4(B) is a section view of a head unit of a reading/writing head device, taken along a radial direction of a magnetic disk.
Figure 5:
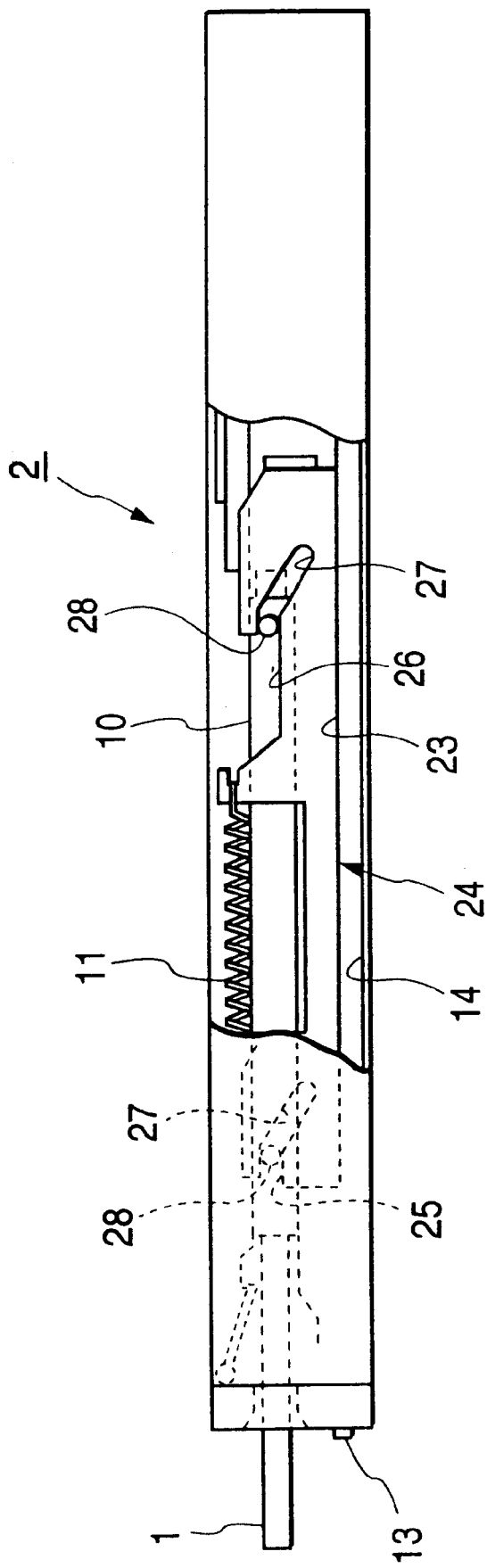
FIG. 5 is a side view showing the magnetic disk drive of the prior art.

When, after or during execution of writing or reading operation by the reading/writing heads 19, a disk ejection signal is supplied from an auto-eject button 45 disposed on the front faces of the magnetic disk drive 30, the controller 34 controls the motor 33 to be reversely rotated or so as to retract the movable member 35. Therefore, as shown in FIG. 3(B), the reading/writing heads 19 are moved to the home position by the rotation of the screw 39, and the upper and lower carriages 36 and 37 are vertically moved along the slopes 42 and 43 of the carriage opening/closing member 41. The rotation of the motor 33 is further maintained so that the movable member 35 is rearwardly moved. When the member reaches a position at which the projections 40 are supported on the upper and lower faces of the rear portion of the carriage opening/closing member 41, the motor 33 is stopped to stop the screw 39.

Under this state, the reading/writing heads 19 are separated from the magnetic data recording surfaces 7 by a predetermined distance, and the magnetic data recording surfaces 7 and the reading/writing faces of the reading/writing heads 19 are kept to form a gap at which data are not damaged, therebetween. Therefore, recorded data are not damaged, and the magnetic disk 1 can be taken out from the magnetic disk drive 30 while not damaging the data. The automatic ejection of the magnetic disk 1 can be performed by a dedicated motor (not shown). For example, a slider and linkage mechanism (not shown) which pushes out the magnetic disk 1 in the ejection direction is disposed in the magnetic disk drive 30, and the slider and linkage mechanism is driven by the dedicated motor, thereby enabling the magnetic disk 1 to be automatically ejected.

As described above, according to the invention, the movable member 35 is moved back and forth by the motor 33 serving as an actuator, and the pair of projections 40 which are opposingly disposed on the opposed faces of the upper and lower carriages 36 and 37 that are elastically supported on the movable member 35 to be vertically opposed to each other are vertically guided along the slopes 42 and 43 of the wedge-like carriage opening/closing member 41, whereby the reading/writing heads 19 are separated from the magnetic data recording surfaces 7 of the magnetic data recording medium 6. When the movable member 35 is moved by the motor 33 in a direction opposite to the above, the reading/writing heads 19 are caused to abut against the magnetic data recording surfaces 7 of the magnetic data recording medium 6. According to this configuration, the mechanism of raising and lowering the magnetic disk drive 30 is simplified as far as possible, and the support arms 20 which are employed in the prior art are not used. Therefore, the invention can provide the magnetic disk drive 30 which is economical, and which does not produce an abnormal sound due to resonance and hence is quiet.

In the magnetic disk drive 30, in order to raise and lower the magnetic disk 1, an elevating mechanism such as the cam plate 24 may be used as it is. Alternatively, a configuration may be used in which a chuck motor (not shown) for rotating the magnetic data recording medium 6 is raised and lowered by repulsion and attraction due to switchover of magnetic poles, and the shaft of the chuck motor and a chucking pin are engaged with and disengaged from corresponding center and chucking holes (not shown) of the magnetic disk 1. In this configuration, a complex structure for raising, lowering, and chucking the magnetic disk 1 can be eliminated, and the production cost can be largely reduced. In the embodiment, the upper and lower carriages 36 and 37 are elastically supported on the movable member 35 by means of the plate springs 16. Alternatively, a structure may be employed in which the upper and lower carriages 36 and 37 are made of an elastic plate material and the portion which is on the side of the reading/writing heads with respect to the elastically supported portion is reinforced by the above-mentioned ribs.

In this way, the invention may be variously modified without departing from the spirit of the invention, and all modifications should be considered to within the scope of the invention.

In the present invention, as described above in detail in the embodiment, a movable member is moved back or forth by an actuator, and a pair of upper and lower projections which are respectively disposed on opposed faces of the pair of upper and lower carriages that are elastically supported on the movable member and vertically opposed to each other are vertically guided by rising- and falling-gradient slopes, whereby reading/writing heads are separated from magnetic data recording surfaces of a magnetic data recording medium. When the movable member is oppositely moved, the upper and lower reading/writing heads are caused to abut against the magnetic data recording surfaces of the magnetic data recording medium. As a result, support arms which are employed in the prior art are not used. Consequently, the invention attains excellent effects such as that it is possible to provide a magnetic disk drive which is economical, and which does not produce an impact sound due to vibration and hence is quiet.

In the present invention, as described above in detail in the embodiment, the surface hardnesses of the rising- and falling-gradient slopes and the projections are set not to be lower than a predetermined value. Therefore, the upper and lower carriages can be smoothly separated from and contacted with the magnetic data recording surfaces of the magnetic data recording medium. Consequently, the invention attains excellent effects such as that it is possible to contribute to an increased density of a magnetic disk.

What is claimed is:

1. A magnetic disk drive for a removable magnetic data recording medium comprising:
    a disk insertion position detecting sensor which detects a fully opened position of a shutter of a removable magnetic data recording medium;
    a controller responsive to the disk insertion position position detecting sensor for generating a driving signal;
    an actuator operable in response to the driving signal from the controller;
    upper and lower carriages elastically supported on a movable member that is moved back and forth by the actuator, said upper and lower carriages being vertically opposed to each other;
    a pair of upper and lower reading/writing heads respectively disposed on opposed faces of said upper and lower carriages, said heads being respectively contacted from upper and lower sides with magnetic data recording surfaces of a removable magnetic data recording medium by a predetermined load pressure, to read and write data;
    projections respectively disposed on said opposed faces of said pair of upper and lower carriages, said projections being opposed to each other and formed integrally with said pair of upper and lower carriages;
    a carriage opening/closing member, having slopes of a rising gradient and a falling gradient, arranged in a space which is between said pair of upper and lower carriages and behind said projections, said slopes respectively allowing, when said movable member is separated from a zero track position of the magnetic data recording medium to be further moved toward a radial outside, said upper projection to be obliquely upward moved in a sliding manner, and said lower projection to be obliquely downward moved in a sliding manner,
    where said pair of upper and lower reading/writing heads are respectively separated from the magnetic data recording surfaces by overriding of said projections over said slopes and sliding movements of said projections.

2. A magnetic disk drive according to claim 1, wherein, at least one surface of each of said rising-gradient slope, said falling-gradient slope, and said projections is set to be higher in hardness than a predetermined value.

3. A magnetic disk drive according to claim 1, wherein said upper and lower carriages are configured of steel plate and said projections are formed by embossing the steel plate.

* * * * *